United States Patent
Alfthan

(10) Patent No.: US 7,644,580 B2
(45) Date of Patent: Jan. 12, 2010

(54) CONTROL COUPLING FOR CHANGING THE FEEDING SPEED OF FEEDING MEMBERS IN A DELIMBING AND CUTTING APPARATUS

(75) Inventor: Arto Alfthan, Tarttila (FI)

(73) Assignee: John Deere Forestry Oy, Tampere (FI)

( * ) Notice: Subject to any disclaimer, the term of this patent is extended or adjusted under 35 U.S.C. 154(b) by 462 days.

(21) Appl. No.: 11/607,408

(22) Filed: Dec. 1, 2006

(65) Prior Publication Data
US 2007/0125447 A1 Jun. 7, 2007

(30) Foreign Application Priority Data
Dec. 2, 2005 (FI) .................................. 20055645

(51) Int. Cl.
*F16D 31/02* (2006.01)
(52) U.S. Cl. ....................................................... 60/425
(58) Field of Classification Search ................... 60/425; 91/520
See application file for complete search history.

(56) References Cited

U.S. PATENT DOCUMENTS

| 3,669,161 A | 6/1972 | Gutman et al. |
| 6,099,273 A | 8/2000 | Allart et al. |
| 6,354,392 B1 | 3/2002 | Cousin et al. |
| 2005/0098231 A1 | 5/2005 | Alftan |

FOREIGN PATENT DOCUMENTS

| DE | 3027983 A1 | 7/1980 |
| DE | 30 27 983 A1 | 2/1982 |
| DE | 31 16 826 C2 | 2/1982 |
| DE | 198 38 651 A1 | 3/2000 |
| DE | 697 19 411 T2 | 1/2004 |
| DE | 697 19 999 T2 | 2/2004 |
| FI | 97340 | 1/1995 |
| FI | 101868 | 2/1997 |
| FI | 114081 B | 3/2002 |
| FI | 20055004 | 4/2005 |
| GB | 21 46 101 A | 4/1985 |
| WO | WO 95/01856 | 1/1995 |
| WO | WO 99/41972 | 8/1999 |
| WO | WO 00/15025 | 3/2000 |
| WO | WO 03/092359 A1 | 11/2003 |
| WO | 2005020669 A1 | 5/2005 |
| WO | WO 2005/043009 A1 | 5/2005 |

OTHER PUBLICATIONS

Sep. 20, 2006 Finnish Office Action with English translation.

*Primary Examiner*—F. Daniel Lopez

(57) ABSTRACT

A control coupling of pressurized medium in a delimbing and cutting apparatus, provided for feeding members and for changing their feeding speed, said control coupling comprising at least: a first motor and a second motor that are coupled in parallel and drive a feeding member a third motor that is a multicapacity motor comprising a first half-motor and a second half-motor and that is coupled in series with the first motor and drives a feeding member; a fourth motor that is coupled in series with the second motor and drives a feeding member; first valve members that for the purpose of free rotation allow the feedback of the pressurized medium exiting the third motor to the first half-motor; and first control members that monitor the pressure of a first line and couple the first valve members to free rotation if said pressure is lower than the set value.

14 Claims, 3 Drawing Sheets

CONTROL COUPLING FOR CHANGING THE FEEDING SPEED OF FEEDING MEMBERS IN A DELIMBING AND CUTTING APPARATUS

This application claims priority to Finnish Patent Application No. 20055645, filed in Finland on 2 Dec. 2005.

FIELD OF THE DISCLOSURE

The invention relates to a control coupling of pressurized medium for feeding members in a delimbing and cutting apparatus and for changing their feeding speed

BACKGROUND OF THE DISCLOSURE

For the processing of tree trunks, a harvester head, i.e. a delimbing and cutting apparatus, is used for the purpose of gripping an upright growing tree, cutting the tree and felling it, after which the tree trunk is delimbed and cut into pieces of fixed length by means of a sawing device. A harvester head with a feed roller is disclosed in WO publication 00/15025. The harvester head is normally connected to the end of the crane of a forest working machine. The harvester head is connected to the crane by means of a joint, and it comprises the necessary actuators, normally hydraulic cylinders and hydraulic motors, for controlling the position of the head and its different functions. The harvester head comprises delimbing members which can be articulated in relation to the frame structure and which comprise delimbing blades for delimbing branches while the trunk is supported and forced through the apparatus. The feeding members comprise a feed roll or a feed track assembly which is pressed against the trunk and pulls it through the apparatus. The harvester head also comprises cutting members, for example a chain saw, for cutting the tree trunk.

Delimbing and cutting apparatuses are also known which are suitable for the handling of tree trunks already felled, for delimbing the tree trunk and cutting it into pieces of fixed length.

A rubber feed roller is disclosed in document WO 95/01856. A feeding device comprising a crawler is disclosed in document U.S. Pat. No. 3,669,161. In WO 99/41972 and FI 97340 B, there are four feed rollers, wherein the feed roller motors of the same side are coupled in series and the feed roller motors of opposite sides are coupled in parallel. A mechanical parallel coupling is used to prevent divergence of the rotational speeds of the motors and, among other things, skid.

The feed motors have normally a fixed displacement, wherein the feeding speed is constant and only depends on the volume flow supplied to the motor. The relatively small size and light weight of the feed motors are suitable in view of the harvester head, aiming at lightness and ease of steering. However, the limited feeding speeds constitute a disadvantage.

In FI 101868 B, in turn, dual-capacity motors are applied as feed motors for a delimbing and cutting apparatus, wherein the apparatus comprises two feeding members, for example feed rollers. A dual-capacity motor is disclosed in U.S. Pat. No. 6,099,273. Said motor is applied primarily in the power transmission of vehicles.

The dual-capacity motor is a radial piston motor comprising an input and output connection as well as an auxiliary connection which can be used as an input or output connection. The motor also comprises a selector, i.e. a stem in a drillhole, by means of which some of the pistons direct the used volume flow to the normal output connection and the other pistons feed it to the auxiliary output connection. In this way, the motor has at least two different capacities (dual-capacity motor), wherein it comprises, in a way, two half-motors. Alternatively, the auxiliary connection can be an auxiliary inlet connection, through which the volume flow is supplied to one of the half-motors. Because of the common shaft, however, the rotation speeds of the half-motors are the same. Said selector can also be missing, in which case the motor always has three connections available, one being connected to all the pistons and the two others being connected to specific separate pistons only, wherein the speeds to be achieved will depend on the couplings with which the motor is controlled.

The coupling of dual-capacity motors, for example in the coupling according to document FI 97340 B, is problematic, because two motors coupled in series are used, and furthermore, one of them is coupled mechanically to a third motor. Speed differences between the feed rollers must be avoided particularly in the use of dual-capacity motors coupled to the system to provide different feeding speeds.

For example, when dual-capacity motors are used, one of the half-motors must normally be let on free circulation to provide different speeds. However, in the design of the free circulation, one must take into account that the half-motor on free circulation will affect the efficiency and the energy economy of the whole system. The effect is the greatest when the half-motor on free circulation causes a significant loss of pressure.

Another factor to be considered in the operation of feed motors coupled in series is cavitation which is caused when the pressure of the liquid used as the pressurized medium drops to a sufficient degree, for example as a result of flow resistance in the suction channel. The cavitation will cause quick wearing of the equipment because of cavitation erosion.

SUMMARY OF THE DISCLOSURE

The present invention enables the above-mentioned coupling which provides multi-speed feeding and good energy economy in a simple manner and prevents unnecessary situations in which cavitation occurs. By means of the coupling, a quick shift to a different speed is made if there is a risk of cavitation, or if desired.

The control coupling for pressurized medium of a delimbing and cutting apparatus according to the invention is primarily characterized in what will be presented in the appended claim 1. The other, dependent claims disclose suitable embodiments of the invention.

The invention relates particularly to the use of a dual-capacity motor as a feed motor for a delimbing and cutting apparatus in a situation in which four feed roller motors are used to rotate the four feed rollers. Alternatively, only three feed rollers are rotated, one of the feed rollers being rotated by two motors. The rotating speeds of the two motors coupled in parallel are bound to each other, preferably by means of a mechanical coupling. By means of the applied dual-capacity motor, at least two different feeding speeds, at which the tree trunk is fed through the delimbing and cutting apparatus, are achieved with the same volume flow. The dual-capacity motor used has a structure with a light weight compared with corresponding motors with adjustable speed. A conventional motor can be replaced with said motor, because the space requirement of the motors is substantially the same, wherein the size of the apparatus will not increase.

By means of the coupling, it is possible to achieve a good energy economy, because the pressure loss caused by the half-motor on free circulation is small. The motor on free circulation is coupled to the side of the return flow, wherein the pressure level loading the motors is low and thereby also the pressure losses are small.

In the control of the coupling, it has also been taken into account that the fluid pressure cannot drop to a critical level in the line between the motors coupled in series. The pressure drops particularly when the motors coupled in series have a speed difference and the latter motor does not receive a sufficient volume flow. The control couples the apparatus to a mode in which said pressure can rise again; that is, the aim is to increase the speed or to utilize the free circulation of the half-motor.

In the coupling, the speeds of two feed rollers coupled in parallel remain equal, to prevent skid. Also, the function of the motors coupled in series and of the feed rollers in the different branches of the feeder lines remains logical, even though a part of the volume flow is redirected to the motors. The selection of the speeds is simple and can also be implemented by simple on/off control.

If the space requirement of the motors does not become a problem, the above-mentioned dual-capacity motor can be replaced with two motors of prior art coupled in parallel and mechanically to each other, for example on the same shaft, so that they have the same speed of rotation.

In one embodiment of the invention, a valve responsible for the different couplings is included in the dual-capacity motor. The motor still comprises three connections, but the $1^{st}$ and $2^{nd}$ positions of the valve are used for controlling the volume flow to the outlet port only and to both the outlet port and an auxiliary port, respectively.

In the invention, a dual capacity motor (or two motors of prior art) is coupled to each feed roller. By means of the coupling, either three or four different feeding speeds, at which the tree trunk is fed through the delimbing and cutting apparatus, are achieved with the same volume flow. If the dual-capacity motors are symmetrical, that is, if the corresponding half-motors of the different motors have equal displacements, three different speeds are achieved with different couplings. If the dual-capacity motors are asymmetrical, that is, if the corresponding half-motors of the different motors have different displacements, four different speeds are achieved with the different couplings.

BRIEF DESCRIPTION OF THE DRAWINGS

The invention will be illustrated in the following description with reference to the appended drawings, in which.

DETAILED DESCRIPTION OF THE DRAWINGS

Figure 1:
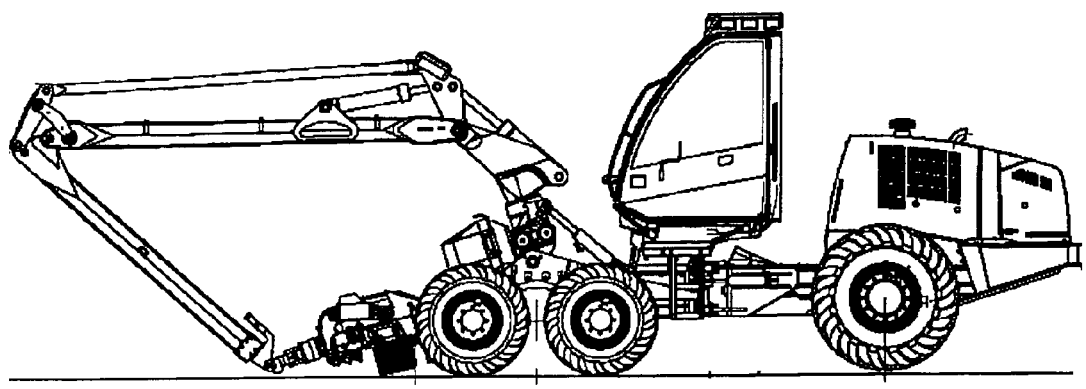
FIG. 1 shows a forest machine which is a harvester in which the invention is applied.

FIG. 1 shows a forest machine of prior art, which is a harvester type known as such and in which the system according to the invention is applicable. The harvester is provided with frame steering, and it comprises a crane system whose end is provided with a harvester head for the processing of trunks. In this case, the control system of the harvester is a PC-based measuring and control system.

Figure 2:
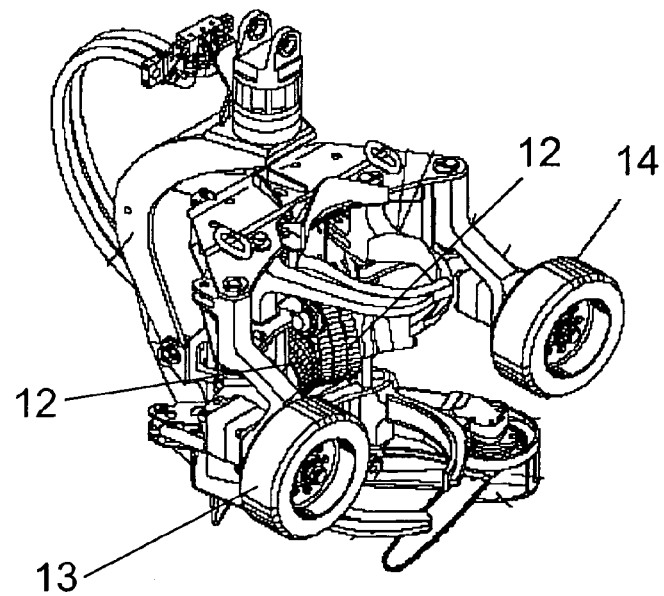
FIG. 2 shows a harvester head to be connected to a forest machine in which the invention is applied.

FIG. 2 shows a harvester head according to prior art in more detail. The harvester head comprises upper delimbing blades, lower delimbing blades, feed rollers 12, 13 and 14, a saw motor, members for feeding a guide bar and for controlling its position, and a tilt function, which are all known as such. The harvester head is used for measuring the diameter of the trunk, typically by means of the upper delimbing blades, and for measuring the length by means of a measuring roll.

The rotational speed of the feed roller varies according to the displacement of the motor when the feed volume flow remains the same, and vice versa. The feed force of the feed roller depends directly on the pressure applied and on the displacement of the motor.

Figure 3:
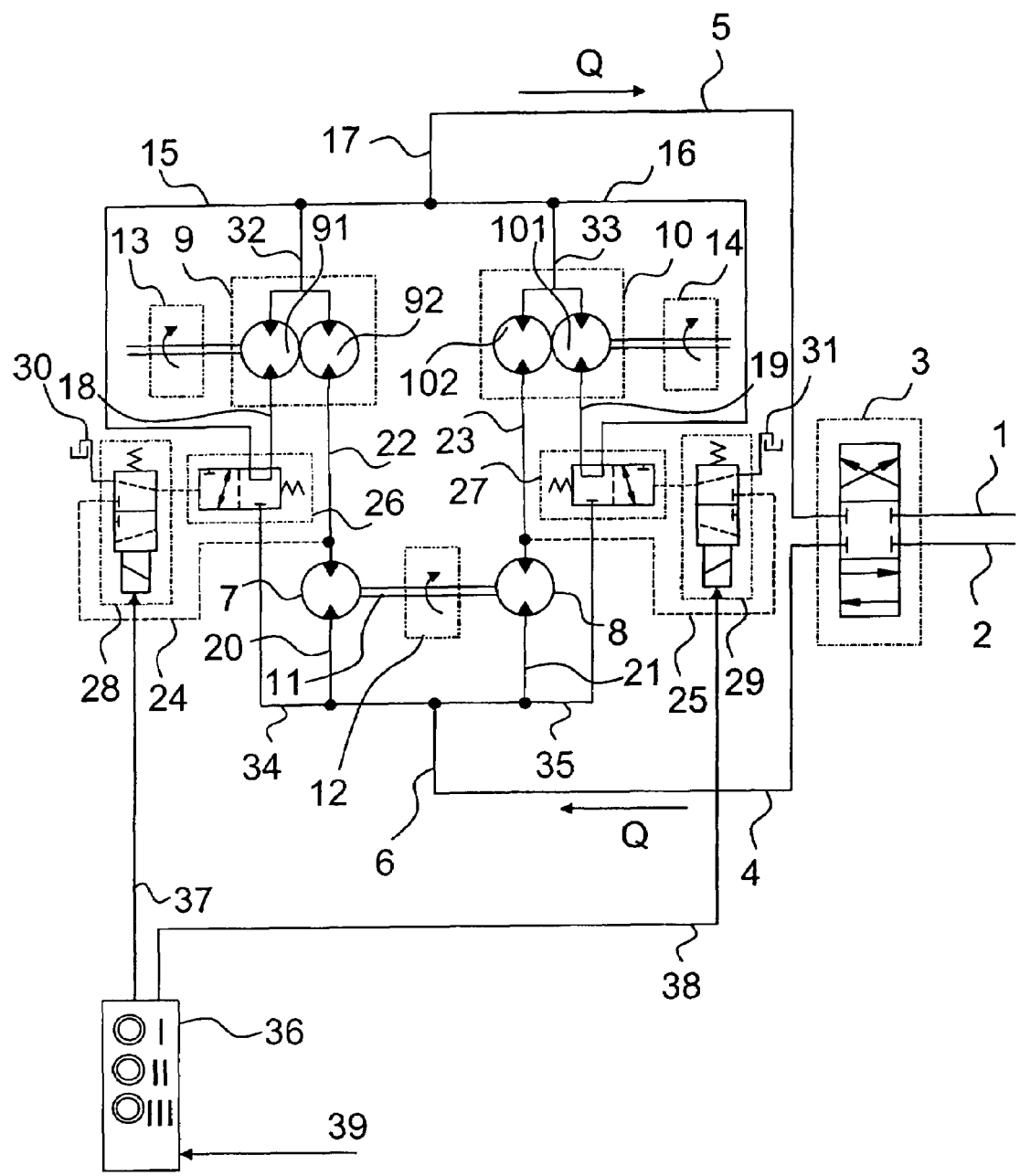
FIG. 3 shows a control circuit comprising two dual-capacity motors and control valves.

FIG. 3 shows a coupling of the feed motors for rotating the feeding members of the delimbing and cutting apparatus. In this case, the feeding members include two feed rollers 13 and 14 which are placed against the trunk, on its opposite sides. The feed rollers 13, 14 are coupled to motors, which is illustrated by means of mechanical shafts in FIG. 3. The feed rollers are known as such, and they are illustrated with a broken line. The motors 9 and 10 of the feed rollers are coupled in parallel to feeder lines 20 and 21. Motors 7 and 8 are also coupled to the feeder lines 20 and 21 and mechanically to each other, as shown by a shaft 11 in FIG. 3. In this embodiment, a feed roller 12 is also coupled on the shaft 11 and is placed typically in the frame of the delimbing and cutting apparatus, against which the trunk is pressed. It is also possible to couple several feed rollers on the shaft 11, and instead of the shaft 11 it is possible to use a mechanical coupling between two feed rollers, implemented by e.g. coggings. If the motors 7 and 8 are identical, they have the same rotational speed due to the interconnection, so that the volume flow Q supplied from the line 6 is evenly distributed in the lines 20 and 21. The volume flow is also evenly distributed to the motors 9 and 10, wherein the rotational speeds of the feed rollers 13 and 14 can be levelled out, to prevent the skid of one feed roller. A fluid pressurized medium, preferably hydraulic oil or the like, circulates in the lines.

A valve 3, which is for example a 3-position 4-way spool valve, is used to select the direction of rotation of the motors 7, 8, 9, and 10, that is, the feeding direction, wherein the volume flow is fed either to a channel 4 (feeding forward, and return flow from a channel 5) or to the channel 5 (feeding backward, and return flow from the channel 4). In the middle position of the valve 3, the channels 4, 5 are closed and the motors are stopped. The valve 3 may also have a position, in which the motors are let on free circulation. The control circuit feeding the valve 3 is known as such, and it comprises at least a pressure connection 1 and a return connection 2. The valve 3 is, for example, a pressure-controlled proportional directional valve.

The motors 9 and 10 are dual-capacity motors comprising two half-motors 91 and 92, or 101 and 102. The volume flow from the motor 7 via a line 22 enters the half-motor 92. The volume flow from the motor 8 via a line 23 enters the half-motor 102. The half-motors of the motors are illustrated with motor symbols plotted next to each other. A corresponding graphic symbol is used for the mechanical interconnection of two conventional motors. At the same time, the common shaft is illustrated, as well as the fact that the half-motors always have a common rotational speed. Alternatively, the half-motors are indicated with a symbol which comprises two motor symbols within each other. Each half-motor comprises two basic connections which are for the supply and for the return of the volume flow. One set of basic connections between the half-motors 91 and 92 is combined within the motor as a stable connection coupled to a line 32. The basic connection of the half-motor 91 can be coupled to a line 15 or to a line 34, depending on the position of a valve 26. A line 18 connects the half-motor 91 to the valve 26. The lines 4 (directly or via the line 6) and 34 are connected to the line 20. One set of basic connections between the half-motors 101 and 102 is combined within the motor as a stable connection coupled to a line 33. The basic connection of the half-motor 101 can be coupled to a line 16 or to a line 35, depending on the position of a valve 27. A line 19 connects the half-motor 101 to the valve 27. The lines 4 (directly or via the line 6) and 35 are connected to a line 21. The lengths of the lines and the connection points may vary as long as the above-presented principle is observed. The configuration of the valves 3, 26, 27, 28, and 29 may also vary, as the function of the valve of FIG. 3 can also be achieved by one or more members used as valves. Two magnet-controlled shut-off valves are mentioned as an example, one being normally open and one being normally closed.

The valves 26 and 27 are used for selecting the different rotational speeds, and the valves are components separate from the motors and can be coupled to the basic connection of the motors. The motors 9 and 10 comprise three available connections. Each valve 26 or 27 is preferably a 2-position 3-way spool valve with pressure control and spring return. The valve 3 and, if necessary, also the valves 28 and 29 are controlled by the control system of the forest machine, which is known as such. The basic connections of the half-motor 91 and 92 are coupled to the line 17 which is shared by the half-motors 101 and 102 of the motor 10, or directly to the line 5. The lines 15 and 16 are connected to the line 5, in this case via the line 17.

The position of the valve 26, in turn, is controlled by a pressure control line 24 coupled to the line 22. Thus, the valve 26 monitors the pressure level of the line 22 and keeps the lines 15 and 18 connected to each other, if the pressure level in the line 22 is not sufficient to keep the valve 26 in the position shown in FIG. 4a. The valve 27, whose position is controlled by a pressure control line 25 coupled to the line 23, operates in a corresponding manner. Thus, the valve 27 monitors the pressure level of the line 23 and keeps the lines 16 and 19 connected to each other, if the pressure level of the line 23 is not sufficient to keep the valve 27 in the position shown in FIG. 5b. The half-motors 91 and 101 are let on free circulation, if the pressure is not sufficient; otherwise the half-motors 91 and 101 are coupled to the lines 34 and 35, wherein the volume flow Q of the line 6 is led to the motors 7 and 8 as well as to the half-motors 91 and 101.

Figure 4A:
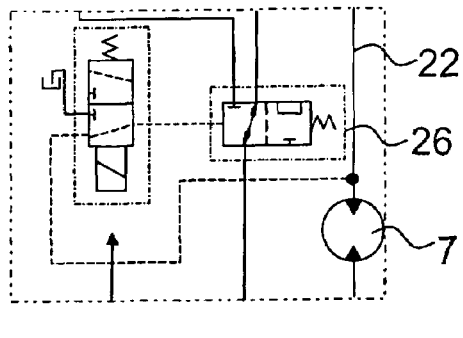
FIGS. 4a, 4b, 5a and 5b illustrate the function of the control valves in the control circuit.
Figure 4B:
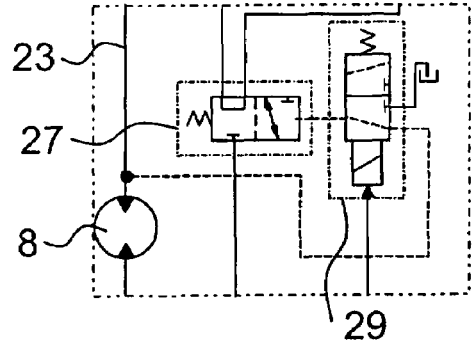
Figure 5A:
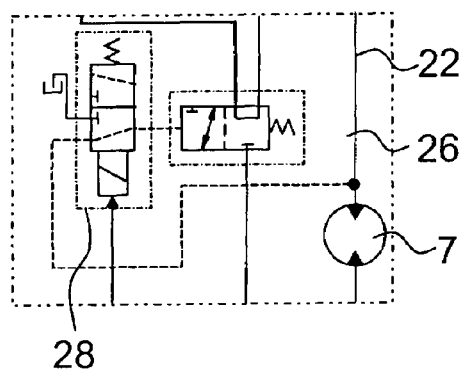

The coupling also comprises valves 28 and 29, by means of which either the valve 26 or 27, or both of them, can be let in a controlled manner to a position in which the half-motors 91 and 101 are let on free circulation. The valves 28 and 29 couple the pressure control connections of the valves 26 and 27 to a tank line 30 or 31 which is thus used as a pressure control line. Instead of the tank lines, it is possible to use a line whose pressure always remains so low that the spring of the valves 26 and 27 can move the slides of the valves. Thus, the half-motor 91 or 101 can be let on free circulation, even though the pressure of the line 22 or 23 were sufficiently high and there were no risk of cavitation. FIGS. 4b and 5a correspond to a situation in which the apparatus is non-pressurized, or a situation in which the apparatus is in operation and the pressure of the lines 22 and 23 is not sufficient to shift the valves 26 or 27.

Consequently, the different speeds of the presented coupling are controlled by controlling the valves 28 and 29 which are, for example, 2-position 3-way slide valves with magnet control and spring return. The speeds of the feed motors depend on whether one half-motor, i.e. either the half-motor 91 or the half-motor 101, both of the half motors 91 and 101, or neither of the half-motors is let on free circulation.

The speed of the motor 9 in the different positions of the valve 26 depends on the ratio between the rotational capacities $Vg_{91}$ and $Vg_{92}$ of the half-motors, and their sum corresponds to the total displacement of the motor 10 in the example of FIG. 3. Thus, the third rotational speed $n_3$ (speed III) can be represented by the formula $n_3=Q/(2\ Vg_{92})$, when the identical half-motors 91 and 101 are on free circulation and a part of the volume flow of the lines 32 and 33 is redirected to the lines 18 and 19, or more generally by the formula $n_3=Q/(Vg_{92}+Vg_{102})$, which is simultaneously the rotational speed of the feed rollers 13 and 14, when no gears are used. The second rotational speed $n_2$ (speed II) can be represented generally by the formula $n_2=Q/(Vg_{91}+Vg_{92}+Vg_{102})$ or $n_2=Q/(Vg_{101}+Vg_{92}+Vg_{102})$, when one half-motor 91 or 101 is on free circulation. The first rotational speed $n_1$ (speed I) can be represented by the formula $n_1=Q/(Vg_{91}+Vg_{92}+Vg_{101}+Vg_{102})$. If, for example, the half-motors 91 and 101 are different from each other, a total of four different speeds ($n_1$, $n_{2A}$, $n_{2B}$, $n_3$) are obtained depending on which half-motor is on free circulation. Thus, the rotational speeds $n_{2A}=Q/(Vg_{91}+Vg_{92}+Vg_{102})$ and $n_{2B}=Q/(Vg_{101}+Vg_{92}+Vg_{102})$ are also obtained. When the system comprises only one dual-capacity motor, the speed II is either $n_{2A}$ or $n_{2B}$ (IIA and IIB) in addition to the speed III.

TABLE 1

| Speed | Motor capacity (cc/r) | Motor capacity % |
|---|---|---|
| I | 1048 | 100 |
| II | 834 | 80 |
| III | 624 | 60 |

According to an example of the invention, the motors 7 and 8 are Danfoss TMT 400 motors with a displacement of 410.9 cc/r. Both the motor 9 and the motor 10 comprises a dual-capacity motor Poclain MSE08 TwinLock 1043, the displacements being 624 cc/r (half-motors 92 and 102) and 418 cc/r (half-motors 91 and 101). Table 1 illustrates various implementations of different couplings of the motors 9 and 10, showing the different speeds (speed I being the lowest speed) and the motor capacity of the coupling corresponding to each speed.

We shall now discuss the function of the coupling and the speeds obtained. In the following description, the feeding direction is forward, and three different speeds are in use.

In one embodiment of the invention, one of the motors 9 or 10 is a conventional motor with only one displacement corresponding to the half-motor of the other motor, namely 624 cc/r. Thus, only the speeds III and II can be achieved. In this case, if for example the motor 10 is conventional, there is no valve 27 or 29 nor lines 16, 19, 25 and 35 in use.

Speed III

The volume flow Q is led by the valve 3 into the line 4. The volume flow Q is divided in four parts so that it is distributed to both motors 7 and 8 as well as to both valves 26 and 27 which are so-called free-circulation valves. In the situation of FIG. 3, the highest speed III is in use, and the half-motors 91 and 101 are let on free circulation. The half-motors on free circulation are only loaded according to the pressure level of the lines 15 and 16, wherein the pressure losses are small and the energy economy is good even during the free circulation. The pressure of the lines 15 and 16 corresponds substantially to the pressure level of the lines 17 and 5, because the lines 5, 16 and 17 are coupled by the valve 3 to the low pressure level prevailing in the return connection 2.

Speed II

A slower feeding speed (speed II, IIA or IIB) is achieved by activating only one of the valves 28 or 29. In this case, valve 28 is selected to be activated. In FIG. 3, the valves 28 and 29 are unactivated, wherein the spring pushes the valves 28 and 29 to a position illustrated by the upper position of the valve symbol. Activation compensates for the effect of the spring, and the valve 28 moves to a position where the pressure of the line 22 can affect the valve 26 and overcome the effect of the spring of the valve 26, as shown in FIG. 4a. The pressure prevailing in the line 22 thrusts the valve 26 to a position illustrated by the left-hand-side position of the valve symbol. A part of the volume flow Q is led to the half-motor 91 (rotational capacity 418 cc/r), which increases the torque obtained from the motor 9, wherein the feeding force increases.

The speed is reduced when compared with the coupling of FIG. 3, because the volume flow through the motors 7 and 8 is reduced. The speed II (IIA or IIB) is maintained as long as the valve 28 is activated or the pressure level of the line 22 is sufficient to maintain the position of the valve 26. Alternatively, if the motors 9 and 10 correspond to each other, the corresponding speed II is achieved by activating only the valve 29 and by subjecting the valve 27 to the pressure level of the line 23.

The valve 28 is controlled, for example, by a separate controller 36 that receives information about the feeding speed of a tree trunk or another signal 39, on the basis of which the controller 36 selects the speed. The signal 39 is obtained, for example, from the measuring and control system of the harvester, known as such, in which the controller 36 can also be integrated and which monitors the feeding speed. Instead of manual buttons of the controller 36, it is possible to use the PC keyboard of the measuring and control system or buttons of the control panel.

In the normal situation, the highest speed III and the coupling of FIG. 3 are used, but if, however, the speed slows down due to an insufficient feeding force, the speed II (IIA or IIB) is switched on. At the same time, the feeding force becomes greater, so that the feeding can be continued normally without stopping the operation or slowing it down too much. In a corresponding manner, the next higher speed III can be selected for use, if the speed II can be maintained. It will be obvious that the controller 36 may comprise the option of selecting and changing the speed manually.

The stiffness of the spring of the valve 26 is selected to determine the lowest pressure level of the line 22, at which the speed II and the corresponding feeding force can still be kept active and in operation. With the above-mentioned components, said lowest pressure level could be, for example, 15 bar. If the speed II is active and the torque provided by the half-motor 91 rotates the motor 9 faster than required by the volume flow from the motor 7 and the line 22, the pressure will drop in the line 22, for example below said 15 bar, and a risk of cavitation occurs. As a result, the valve 26 returns to the position shown in FIG. 5a and lets the half-motor 91 on free circulation. The half-motor 91 is turned off, and the pressure can rise in the line 22, after which the pressure will be sufficient again to shift the valve 26 to take the half-motor 91 in use. By monitoring the pressure level in the line 22, the control line 24 can be used to provide a mechanism to prevent cavitation. In a corresponding manner, the situation is under control in the line 23, where the valve 27 moves to a position shown in FIG. 4b.

Speed I

Figure 5B:
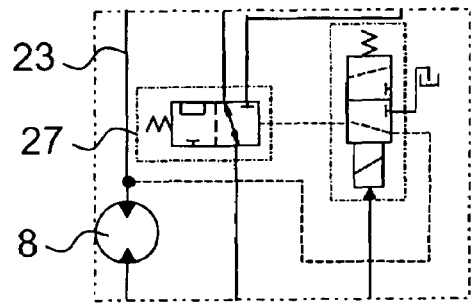

The lowest feeding speed (speed I) is obtained by activating both valves 28 and 29 according to FIGS. 4a and 5b. The valves 28 and 29 move to a position in which the pressure of the lines 22 and 23 can affect the valves 26 and 27. The pressure prevailing in the line 23 pushes the valve 27 to a position illustrated by the right-hand-side position of the valve symbol. A part of the volume flow Q is led via both the half-motor 91 (displacement 418 cc/r) and the half-motor 101 (displacement 418 cc/r) and increases the torque obtained from the motors 9 and 10, wherein the feeding force increases. The speed is reduced when compared with the speed II, because the volume flow through the motors 7 and 8 is reduced. The speed I remains as long as the valves 28 and 29 are activated and the pressure levels in the lines 22 and 23 are sufficient. A drop in the pressure level will result in a situation according to either FIG. 5a, FIG. 4b, or both of them, shifting into speed II or III.

Figure 6:
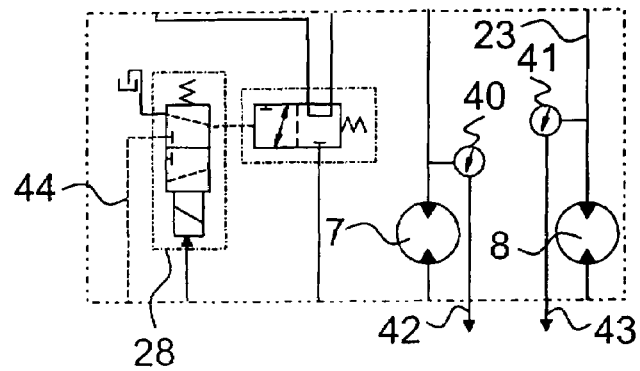
FIG. 6 shows an alternative coupling as a precaution for the risk of cavitation.

With reference to FIG. 6, the control of the cavitation risk can also be implemented by coupling a sensor 40 or 41 to measure the pressure electrically in the line 22 or the line 23, or both of them. A pressure signal 42 or 43 is thus led to a controller 36 which activates the valve 28 or 29, if the pressure in the line 22 or 23 drops below a set limit. The pressure signal 42, 43 reflects the pressure level, and it is compared with the set limit. In that case, the control line 24 or 25 does not need to be coupled directly to the line 22 or 23, but the control lines 24 and 25 are coupled, for example, to the valve of the harvester head, for example to the pressure connection 1, from which a sufficient pressure is always obtained for the control of the valve 26 or 27. In the situation of FIG. 6, the valve 28 is not activated. Alternatively, the valves 26 and 28 or the valves 27 and 29 can also be integrated in the same valve, in which the valves 28 and 29 act as so-called pilot valves for the actual valves 26 and 27 which pass a greater volume flow and which are controlled by pressure.

In a situation in which a tree trunk is moved backwards for a new feeding, the direction of the volume flow Q is opposite to that of FIG. 3. The volume flow Q is led to the line 5. However, the speeds I, II and III are controlled in the same way as presented above for the part of the valves. Nevertheless, in feeding backward, a situation may occur in which the motor 9 or 10 is not rotating or is rotating more slowly than the other motors.

The invention is not limited solely to the above-presented embodiments used as examples, but it can be modified within the scope of the appended claims. As already stated above, an alternative is to implement only two speeds (speeds II and III) by using only one dual-capacity motor, or four speeds (speeds I, IIA, IIB and III) by using two dual-capacity motors.

Having described the preferred embodiment, it will become apparent that various modifications can be made without departing from the scope of the invention as defined in the accompanying claims.

The invention claimed is:

1. A control coupling of pressurized medium in a delimbing and cutting apparatus, provided for feeding members and for changing their feeding speed, said control coupling comprising:
   a first motor and a second motor coupled in parallel and arranged to drive a first feeding member, the rotational speeds of the motors being bound to each other,
   a third motor which is a multi-capacity motor comprising a first half-motor and a second half-motor, wherein the second half-motor is coupled in series with the first motor by means of a first line, and arranged to drive a second feeding member, a fourth motor coupled in series with the second motor by means of a second line, and arranged to drive a third feeding member, a first valve member arranged to connect across the first half-motor, to allow free circulation, in a first position, and, in a second position, to couple the first half-motor of the third motor in parallel with the first motor, and a first control member arranged to monitor the pressure in the first line and to let the first valve member move to the first position, when said pressure is lower than a set value.

2. The control coupling according to claim 1, wherein:

the fourth motor is a multi-capacity motor comprising a first half-motor and a second half-motor, and the control coupling also comprises a second valve member arranged to connect across the first-half motor of the fourth motor, to allow free circulation, in a first position, and, in a second position, to couple the first half-motor of the fourth motor in parallel with the second motor, and the control coupling also comprises a second control member arranged to monitor the pressure in the second line and to let the second valve member on free circulation, if said pressure is lower than the set value.

3. The control coupling according to claim 2, wherein the second control member comprises fourth valve member arranged both to prevent and to allow the coupling of the pressure of the second line to the second valve member for control, to change the position of the second valve member by means of said pressure.

4. The control coupling according to claim 3, wherein the half-motors of the third motor are different from the half-motors of the fourth motor.

5. The control coupling according to claim 2, wherein the second control member comprises:

a second sensor member arranged to generate a signal indicating the pressure of the second line, an electrically controlled fourth valve member arranged both to prevent and to allow the coupling of the control pressure to the second valve member for control, to change the position of the second valve member by means of said control pressure, and a controller arranged to control the fourth valve member on the basis of said signal.

6. The control coupling according to claim 5, wherein the half-motors of the third motor are different from the half-motors of the fourth motor.

7. The control coupling according to claim 2, wherein the half-motors of the third motor are different from the half-motors of the fourth motor.

8. The control coupling according to claim 1, wherein the third motor comprises a first basic connection, through which the pressurized medium is supplied jointly to the first half-motor and the second half-motor, a second basic connection to which the pressurized medium is transmitted from the first half-motor, and a third basic connection, to which the pressurized medium is transmitted from the second half-motor.

9. The control coupling according to claim 1, wherein the first control member comprises a third valve member arranged both to prevent and to allow the coupling of the pressure of the first line to the first valve member for control, to change the position of the first valve member by means of said pressure.

10. The control coupling according to claim 1, wherein the first control member comprises:

a first sensor member arranged to generate a signal indicating the pressure of the first line, an electrically controlled third valve member arranged both to prevent and to allow the coupling of the control pressure to the first valve member for control, to change the position of the first valve member by means of said control pressure, and a controller arranged to control the third valve member on the basis of said signal.

11. The control coupling according to claim 1, wherein the first valve member are configured as an internal component of the third motor.

12. The control coupling according to claim 1, wherein the first motor and the second motor are coupled mechanically to each other for synchronizing the rotational speeds.

13. The control coupling according to claim 1, wherein the total displacement of the first motor corresponds to the total displacement of the second motor, and the rotational capacity of the second motor corresponds to the displacement of the second motor.

14. The control coupling according to claim 1, wherein the first, second and fourth motors are motors with a constant displacement.

* * * * *